May 22, 1956 — W. H. VANN — 2,746,429
CRANKSHAFT REAR BEARING CAP OIL SEAL
Filed June 9, 1951
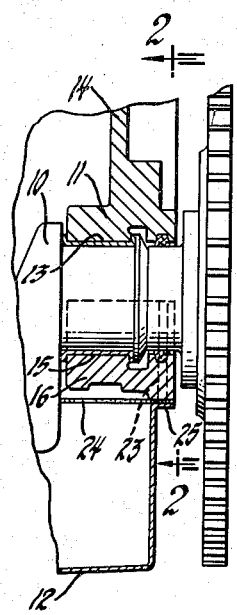
Fig. 1
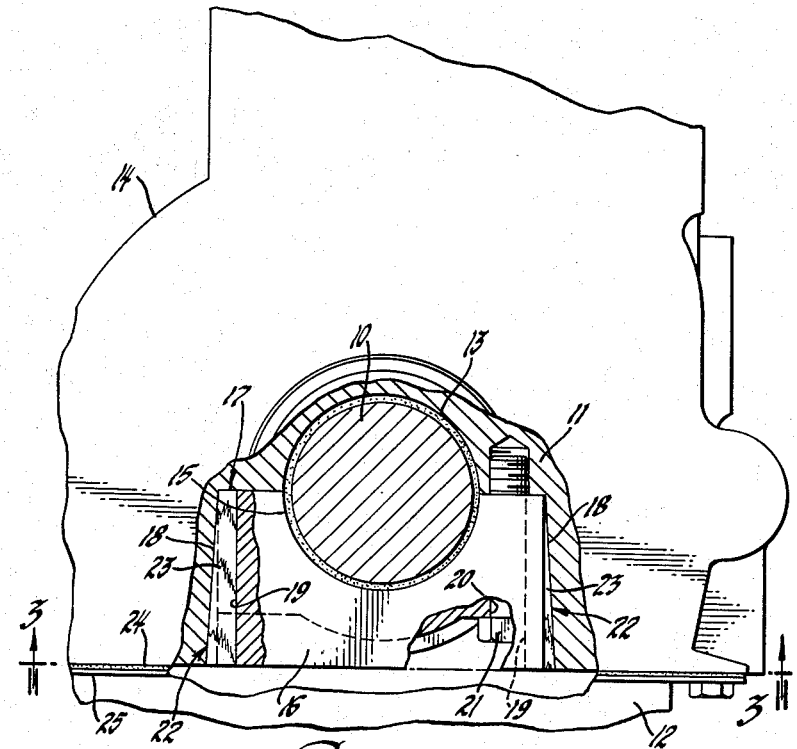
Fig. 2
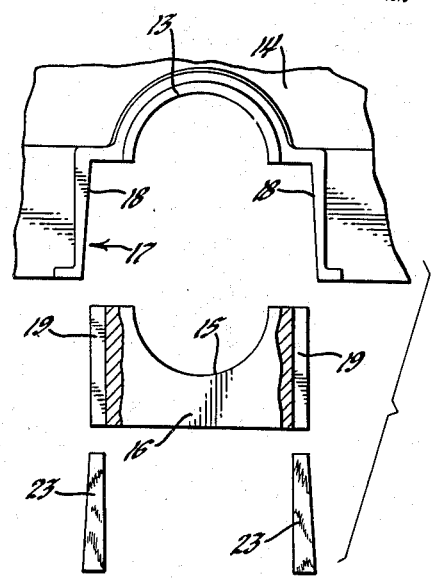
Fig. 4
Fig. 3
Inventor
William H. Vann
By Willits, Helmig & Baillio
- Attorneys

United States Patent Office 2,746,429
Patented May 22, 1956

2,746,429

CRANKSHAFT REAR BEARING CAP OIL SEAL

William H. Vann, Pontiac, Mich., assignor to General Motors Corporation, Detroit, Mich., a corporation of Delaware Application June 9, 1951, Serial No. 230,763

9 Claims. (Cl. 121—194)

The invention relates to an oil seal for a crankshaft rear bearing assembly.

In an engine, there is a problem of preventing the leakage of lubricating oil out of the engine block through the main crankshaft bearings. In the past, such leakage prevention has been attempted in several ways including, machining the mating parts of the bearing supporting assembly to rather close tolerances, thus endeavoring to prevent leakage by virtue of the tight fitting of parts when assembled. It is apparent that such a process is expensive and not always successful. Gaskets have also been used and the result usually favorable when the joining surfaces of the parts lie in one plane. Where, however, certain assembling or structural advantages accrue from other than one plane jointage of parts, such gaskets are inefficient. It is, therefore, an object to provide herein a main bearing and lubricant sealing assembly which is economical to manufacture, simple to assemble and has a minimum number of parts with which to prevent the leakage of lubricant.

It is also an object of the invention to provide a two-part leakage proof bearing in which one bearing supporting member fits within the engine block so as to present a lower surface flush with the bottom of said block.

It is another object of the invention to provide a bearing supporting member formed in the engine block and including a tapered recess adapted to receive a lower supporting member and a tapered sealing means.

It is also an object to provide a bearing assembly in which the sealing means may be inserted after the bearing has been assembled.

It is a further object of the invention to provide tapered sealing means formed from a fibrous material to the shape of the space defined by the tapered recess and lower supporting member and also to form to the sealing means of sufficient size that it must be driven into position.

Other objects and advantages, as well as the construction and assembling of the component parts, will appear from the descriptive matter which follows.

In the drawing:

Figure 1 is a fragmentary section through the rear end of an engine block and oil pan showing the general relation of parts.

Figure 2 is a partial section substantially along line 2—2 of Figure 1 showing the bearing assembled and the sealing means in position.

Figure 3 is a bottom view taken substantially along line 3—3 of Figure 2 showing the relation of the bearing supporting members and the sealing members.

Figure 4 is an exploded view of the upper and lower bearing supporting members as well as sealing means.

Referring to the drawing, a crankshaft 10 is shown supported in a rear main bearing 11. The crankshaft and the bottom of the main bearing are enclosed in an oil pan 12. The main bearing 11 is divided into an upper half 13 formed in an engine block 14 and a lower half 15 formed in a bearing cap 16. Also formed in the engine block 14 is a downwardly opening recess 17 disposed immediately below bearing 13 and which recess has downwardly diverging walls 18. As may be seen in Figure 2, the bearing surface 13 and recess 17 meet in a horizontal plane substantially through the centerline of the main bearing 11 with the bearing surface lying above and the recess below said plane.

The bearing cap, or lower supporting member 16 is substantially rectangular in cross-section, save for the bearing surface 15 formed in the upper face thereof. The cap is constructed so as to be secured within the recess 17 such that the bottom face of said cap is flush with the bottom surface of the engine block. By so providing an engine block which extends below the centerline of the crankshaft and within which the lower supporting member may be supported, it becomes unnecessary to deform the oil pan in order to accommodate the lower bearing supporting member as has been the case in the past. Bearing surface 15 is formed so as to conjoin with bearing surface 13 to define a continuous cylindrical bearing for the crankshaft when the bearing cap is inserted in position within recess 17. As may be further seen, cap 16 is provided with an opening 20 extending upwardly therethrough on each side of the bearing 14 and through which openings studs 21 secure the cap against the upper portion of the recess 17. A rectangular groove 19 is formed in each of the vertical sides of the cap 16. Groove 19 is of uniform depth throughout the length thereof and terminates respectively in the upper and lower faces of the cap 16.

When the cap 16 is assembled within the recess 17, a tapered chamber 22 is formed by the groove 19 and the respective adjacent tapered wall 18. Chamber 22 being adapted to receive appropriate sealing means to prevent the leakage of lubricant therethrough.

To insure a proper lubricant sealing means, tapered plugs or seals 23 are provided. Each seal is made from a fibrous material, such as wood, which will absorb a limited amount of lubricant and thus expand to more perfectly seal the bearing. The seal is shaped to conform generally to the shape of chamber 22, that is, having two parallel sides and a flat face to seat within the groove 19, and a tapered face which corresponds to and abuts against the respective tapered wall 18. Although the seal 23 is of the same shape as chamber 22, it is made over-size so that the seal must be driven into position thus enhancing the sealing qualities of the plug as well as making any further securing means therefor unnecessary. The seal is also made slightly longer than the height of chamber 22 so that the seal, in being driven into position, will be flush with or project slightly below the lower surface of the engine block in which latter instance the slight protuberance will be accommodated in crank case gasket 24. The added length of seal 23 insures that there will be no gap between the end of the seal and the gasketed flange 25.

The bearing and seal are assembled as follows. The crankshaft is seated in the upper supporting member, then the bearing cap inserted in the recess in said member and secured therewithin, thereby fully supporting the shaft. Finally, the seals are driven into the chambers formed by the tapered walls and grooves and the bearing assembly is complete.

It will thus be seen that an effective and simple bearing and sealing assembly has been devised which will prevent the leakage of oil through the rear main crankshaft bearing of an engine. While the invention has, for the sake of simplicity, been shown in one form and in the setting of an internal combustion engine, it is not intended to limit the applicability of the invention thereto. It is apparent that minor structural variations may be made within the scope of the invention as set forth.

I claim:
1. In a crankshaft supporting device of the type embodying a split bearing assembly having an upper bearing formed in an engine block and a lower bearing formed in a supporting member, in which said engine block also includes a tapered recess formed therein and disposed immediately below the upper bearing, said recess being constructed to receive said lower bearing supporting member therewithin and tapered sealing means being adapted to coact with the tapered recess and the lower bearing supporting member to prevent the leakage of lubricant therebetween.

2. In a crankshaft bearing supporting device including a pair of supporting members constructed to jointly define a continuous bearing surface for said crankshaft, a recess formed in one supporting member with inwardly tapering end walls, a second bearing supporting member being adapted to be removably secured within said recess, said second bearing supporting member having a groove formed in the vertical edges thereof, and tapered sealing means being adapted to seat within said groove and abut against said tapering end walls of said recess thereby preventing the leakage of lubricant between said supporting members.

3. In a crankshaft supporting device including a first bearing surface formed in an engine block, a tapered recess formed centrally of said bearing and disposed immediately therebelow, the width of said recess being greater than the diameter of the bearing surface, a bearing supporting member being adapted to fit within said recess, said member having a bearing surface being adapted to mate with said first bearing surface, said member also having substantially vertical sides, the vertical sides of said member and the tapered walls of said recess being constructed to define tapered chambers and sealing means being adapted to fit within said chambers to prevent the leakage of lubricant therethrough.

4. In a crankshaft lubricant sealing device including an upper supporting member for the crankshaft, said member including a semi-cylindrical bearing surface formed therein above the centerline of said shaft and a downwardly opening recess formed centrally of said bearing surface below the centerline of said shaft, the walls of said recess being tapered so as to diverge downwardly, a lower supporting member adapted to be secured within said recess, said latter member including an upper face having a semi-cylindrical bearing surface formed therein and vertical edges having a rectangular groove of uniform depth formed therein, said groove terminating respectively in the upper and lower faces of said supporting member, said groove and its respective tapered wall defining a tapered chamber when the supporting members are assembled, an elongated fibrous sealing plug being adapted to seal said chamber thereby preventing the leakage of lubricant therethrough, said plug having a rectangular cross-section and a flat side being adapted to seat within said groove, said plug also having a tapered side corresponding to and being adapted to abut against said tapered recess wall, said sealing plug being constructed so as to be larger than said chamber whereby the sealing member forms a tight seal when driven into said chamber.

5. A bearing device comprising a first member having a recess extending inwardly from one side thereof, said recess including a pair of side walls and a bottom having a portion therof adapted to form a bearing surface, a second member disposed in said recess and having a pair of side walls in juxtaposition to said first pair of side walls and an end having a portion thereof adapted to form a bearing surface to cooperate with said first bearing surface, one of said pairs of side walls being inwardly convergent towards said other pair of side walls to form wedge shaped spaces therebetween, and tapered seals driven into said spaces between said side walls.

6. A bearing device comprising a first member having a recess extending inwardly from one side thereof, said recess including a pair of side walls and a bottom having a portion thereof adapted to form a bearing surface, a second member disposed in said recess and having a pair of side walls in juxtaposition to said first pair of side walls and an end having a portion thereof adapted to form a second bearing surface to cooperate with said first bearing surface, one of said pairs of side walls having a groove extending longitudinally thereof, one of said pairs of side walls being inwardly convergent towards said other pair of side walls and tapered seals disposed in said grooves.

7. A bearing device comprising a first member having a recess extending inwardly from one side thereof, said recess including a pair of side walls and a bottom having a portion thereof adapted to form a bearing surface, a second member disposed in said recess and having a pair of side walls in juxtaposition to said first pair of side walls and an end thereof having a portion thereof adapted to form a second bearing to cooperate with said first bearing surface, the side walls in one of said pair being substantially parallel with each other and having grooves extending longitudinally thereof, the other of said pair of walls being inwardly convergent, and tapered sealing members disposed in said grooves so as to be compressed between said side walls.

8. In an engine the combination of a cylinder block, a crankshaft rotatably disposed in a crankcase formed on the bottom of said block, one end of said block having a recess extending inwardly from one side thereof, said recess including a pair of side walls and a bottom wall, an insert disposed in said recess and having a pair of side walls and an end wall disposed in juxtaposition to said first pair of side walls and bottom wall, respectively, said bottom and end walls having bearing surfaces formed thereon suitable for rotatably supporting said crankshaft, one of said pair of side walls being substantially parallel to each other and the other pair of side walls being inwardly convergent towards each other so as to form tapering spaces therebetween, one of said pair of side walls having axially extending grooves therein, a tapered sealing member disposed in each of said grooves and being compressed between the adjacent side walls.

9. Sealing means comprising a first member having a surface thereon and a second member adapted to be secured to said first member with a surface thereon disposed in juxtaposition to said first surface, one of said members having a groove extending longitudinally of said surface on said member, the other of said surfaces being angularly disposed with respect to the other of said surfaces to form a wedge shaped space therebetween and a sealing member tapered longitudinally thereof corresponding to said space and being adapted to be disposed in said groove and compressed between said surfaces for sealing the space therebetween.

References Cited in the file of this patent
UNITED STATES PATENTS

| Number | Name | Date |
|---|---|---|
| 163,409 | Raoul | May 18, 1875 |
| 2,058,760 | Barber | Oct. 27, 1936 |
| 2,468,976 | Herreshoff et al. | May 3, 1949 |
| 2,486,927 | Chapman | Nov. 1, 1949 |
| 2,655,135 | Dalenberg | Oct. 13, 1953 |
| 2,657,675 | McGowen | Nov. 3, 1953 |